United States Patent [19]

Dinallo

[11] Patent Number: 5,727,212
[45] Date of Patent: Mar. 10, 1998

[54] OBJECT ORIENTED DEVICE DRIVER SYSTEM FOR PROCEDURAL DEVICE DRIVERS

[75] Inventor: Chris A. Dinallo, Boca Raton, Fla.

[73] Assignee: International Business Machines Corporation, Armonk, N.Y.

[21] Appl. No.: 420,919

[22] Filed: Apr. 12, 1995

[51] Int. Cl.⁶ .................................................. G06F 13/10
[52] U.S. Cl. .................................... 395/681; 395/683
[58] Field of Search ............................ 395/700, 500, 395/681, 680, 683

[56] References Cited

U.S. PATENT DOCUMENTS

| | | | |
|---|---|---|---|
| 5,179,666 | 1/1993 | Rimmer et al. | 395/275 |
| 5,252,951 | 10/1993 | Tannenbaum et al. | |
| 5,265,252 | 11/1993 | Rawson, III et al. | 395/700 |
| 5,280,610 | 1/1994 | Travis, Jr. et al. | |
| 5,291,585 | 3/1994 | Sato et al. | |
| 5,339,430 | 8/1994 | Lundin et al. | |
| 5,341,478 | 8/1994 | Travis, Jr. et al. | |
| 5,361,350 | 11/1994 | Conner et al. | |
| 5,361,351 | 11/1994 | Lenkov et al. | |
| 5,379,432 | 1/1995 | Orton et al. | 395/700 |
| 5,432,925 | 7/1995 | Abraham et al. | 395/500 |
| 5,471,675 | 11/1995 | Zias | 395/162 |
| 5,566,346 | 10/1996 | Andert et al. | 395/828 |

OTHER PUBLICATIONS

"The C++ Programming Language", *1991 Addison–Wesley Publishing Company*, B. Stroustrup, pp. 13–25, Section 5.2.1, pp. 145–147, Section 6.2.2, pp. 186–189, Chapter 13, pp. 456–463.

"Advanced Topics in Device Driver Design", *Proc. 5th Ann. Embedded Systems Conf*, E. Tuggle, pp. 437–454.

IBM TDB, "Micro–Code Download Method in Hard Disk Drive", vol. 38, No. 03, Mar. 1995, p. 131.

*Primary Examiner*—Alvin E. Oberley
*Assistant Examiner*—Sue Lao
*Attorney, Agent, or Firm*—Mark S. Walker; Jack V. Musgrove; Andrew J. Dillon

[57] ABSTRACT

A method of and apparatus for bridging communications between an object oriented component and a procedural programmed device driver are disclosed. Both the object oriented component and the procedural programmed device driver are part of a data processing system. Both the method and apparatus isolate the object oriented component from any device driver, specifically the active device driver, by encapsulating the specific driver information associated with that particular device driver and then transporting requests or commands from the object oriented component to the specific device driver when interfacing with the device driver. The object oriented component generates an interface object that allows for opening communication or closing communication to the device driver as well as initializing the device using the information within the device driver and for controlling the device via the device driver. A transport object is also generated, which allows the transporting of data from the object oriented selected device driver to the object oriented component. This transport object also allows data flow to be controlled between the component and the selected device driver.

10 Claims, 6 Drawing Sheets

OBJECT ORIENTED DEVICE DRIVER SYSTEM FOR PROCEDURAL DEVICE DRIVERS

BACKGROUND OF THE INVENTION

1. Technical Field

The present invention relates in general to data processing systems having both object oriented applications and procedural programmed applications, and more particularly, to data processing systems using object oriented operating systems that interface with procedural device drivers. More specifically still, the present invention relates to a data processing system that uses object oriented components to interface with procedural device drivers using an object oriented solution.

2. Description of the Related Art

Object oriented programming has become an important new programming technology. Object oriented programming has greatly simplified software programming by providing software reusability and extensibility, which leads to improved programmer productivity as compared to conventional software programming. Even so, object oriented technology has not effectively penetrated major commercial software products to date. In particular, operating systems have hesitated to embrace the new technology.

Nevertheless, object oriented programming (OOP) is beginning to obtain acceptance in the industry. Unfortunately, one problem facing object oriented programming with respect to procedural programming is that most of today's existing software is comprised mostly of procedural code, which, by nature, is quite monolithic in its design and not up to the flexible requirements of the object oriented software. Furthermore, the strict procedural approach is further entrenched into today's software from the top down (from applications through the operating system into the device drivers), which make moving to OOP much more difficult.

In many cases, the operating system and its device drivers have to be rewritten to the standards of OOP in order for an object oriented software component to be implemented. Another way to implement object oriented components is to design a hybrid OO component where it reverts back to a procedural mode when it needs to interface with other existing procedural software components, such as operating systems or device drivers or both. This hybrid model of OO and procedural is counterproductive to the advantages that OOP has to offer. Furthermore, the overall integrity of the software is now at risk.

Accordingly, what is needed is a design and implementation that neither forces a rewrite of existing procedural device drivers nor does it force the OO software component into a hybrid mode. Further, what is need is a general OOP device driver interface to bridge OOP components with procedural programmed components regardless of the base software running the data processing system.

SUMMARY OF THE INVENTION

It is therefore one object of the present invention to provide data processing systems having both object oriented applications and procedural programmed applications.

It is another object of the present invention to provide data processing systems using object oriented operating systems that interface with procedural device drivers.

It is yet another object of the present invention to provide a data processing system that uses object oriented components to interface with procedural device drivers using an object oriented solution.

The foregoing objects are achieved as is now described. According to the present invention, a method of and apparatus for bridging communications between an object oriented component and a procedural programmed device driver are disclosed. Both the object oriented component and the procedural programmed device driver are both part d a data processing system. Both the method and apparatus isolate the object oriented component from the device drivers, specifically the active device driver, by encapsulating the specific device driver information associated with that particular device driver and then transporting requests or commands from the object oriented component to the specific device driver when interfacing with the device driver. The object oriented component generates an interface object that allows for opening communication or closing communication to the device driver as well as initializing the device using the information within the device driver and for controlling the device via the device driver. A transport object is also generated, which allows the transporting of data from the object oriented selected device driver to the object oriented component. This transport object also allows data flow to be controlled between the component and the selected device driver.

In an alternative embodiment, the method for bridging communication between the object oriented component and the programmed device driver creates the object oriented component within an object oriented subsystem. Next, the system constructs an interface object and then constructs a transport object within the object oriented subsystem. Then, communication is established between the device driver and the object oriented component via the interface and the transport objects. The interface object allows the data types to be set from the object oriented subsystem and for component attributes of the device driver as well. Both the transport object and the Interface object allow commands to be performed from the oriented subsystem by the device driver as well as allowing data to be transmitted between the object oriented subsystem and device driver.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

The present invention utilizes the techniques inherent in object oriented design and programming (OOD & P) such as encapsulation of both data and code within the invented classes. These classes have an OO interface for other software components to communicate to it and to contain the necessary procedural interfaces for it to communicate with other procedural components, such as, for example, device drivers. Although it appears to be a hybrid solution, significantly, it stands independent of other OO components needing to communicate with the procedural components. The invention provides for a generic, self contained interface between two programming models, namely OOD & P and procedural programming. Additionally, the present invention makes use of many of the concepts of object oriented design and programming as taught in U.S. Pat. No. 5,361,350, entitled, "Object Oriented Method Management System and Software for Managing Class Method Names in a Computer System," commonly assigned to the assignee of the present invention and herein incorporated by reference for all purposes.

Figure 1:
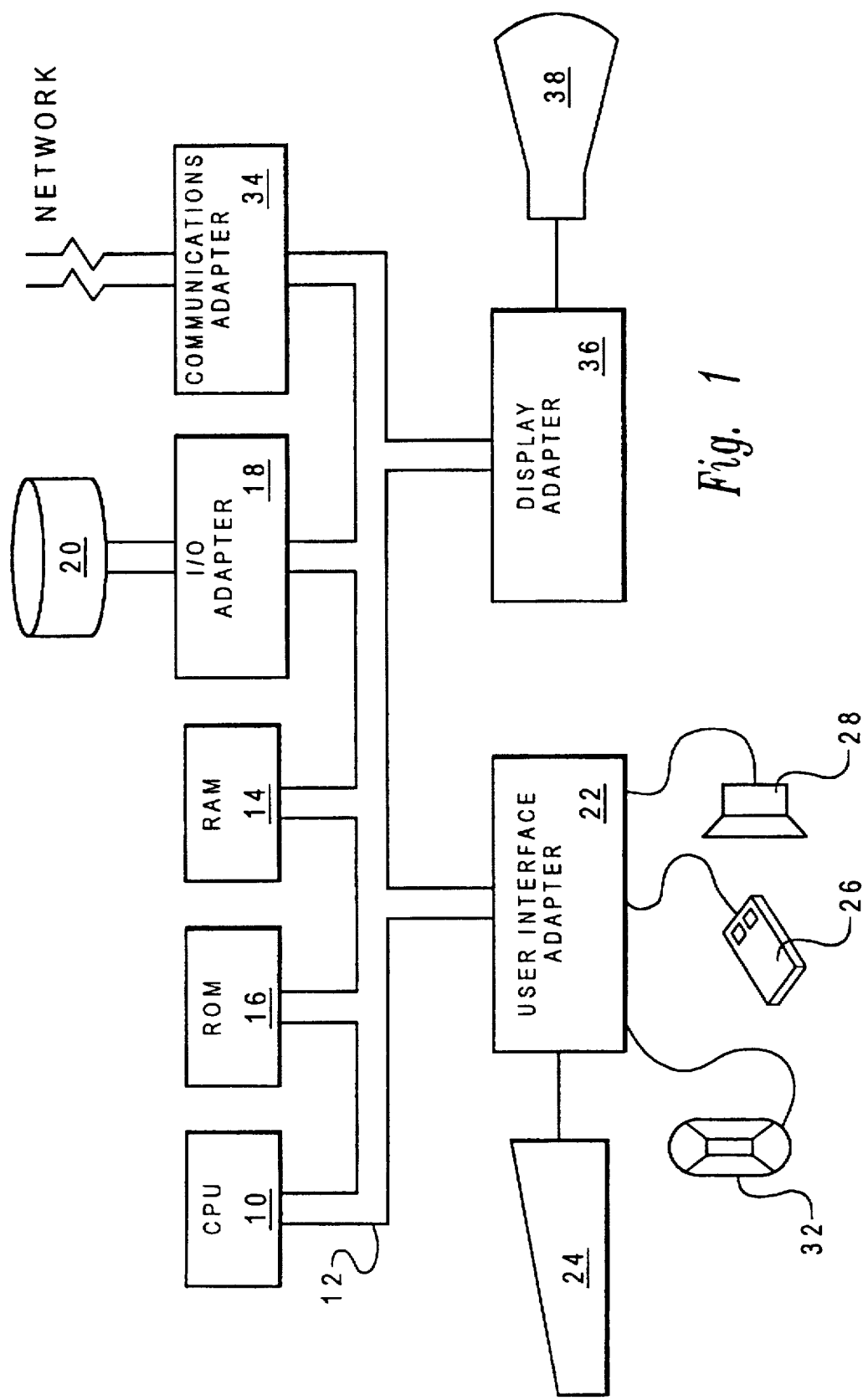
FIG. 1 depicts in accordance with a preferred embodiment of the present invention a hardware environment upon which is implemented the present invention.

The invention is preferably practiced in the context of an operating system resident on microcomputers such as personal computers and work stations. A representative hardware environment is depicted in FIG. 1, which illustrates a typical hardware configuration of a workstation in accordance with the subject invention having a central processing unit 10, such as a conventional microprocessor, and a number of other units interconnected via a system bus 12. The workstation shown in FIG. 1 includes a Random Access Memory (RAM) 14, Read Only Memory (ROM) 16, an I/O adapter 18 for connecting peripheral devices such as disk units 20 to the bus, a user interface adapter 22 for connecting a keyboard 24, a mouse 26, a speaker 28, a microphone 32, and/or other user interface devices such as a touch screen device (not shown) to the bus, a communication adapter 34 for connecting the workstation to a data processing network and a display adapter 36 for connecting the bus to a display device 38. The workstation has resident thereon the OS/2 base operating system and the computer software making up this invention which is included as a toolkit.

ROM 16 may further comprise additional ROM units, such as, for example, an on board chip ROM, a compact disk ROM. Additionally, instead of OS/2, the operating system may be selected from the types such as AIX, which is available from International Business Machines, Inc., Windows, DOS, NT, which are product available from Microsoft, Inc., Taligent O/S, available from Taligent Corporation, as well as the various UNIX operating systems provided by various software companies. Additionally, the present invention is also capable of operating on larger minicomputers, such as, AS/400 workstation systems, also manufactured by International Business Machines, Inc., and larger mainframe computer systems.

Figure 2:
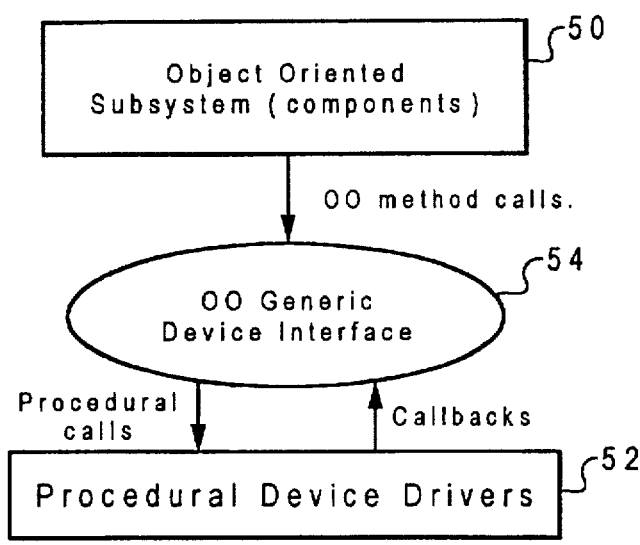
FIG. 2 illustrates a block diagram of a system that provides a bridge between object oriented software components and procedural device drivers.

FIG. 2 illustrates a block diagram of a system that provides a bridge between object oriented software components 50 that need to communicate to procedural device drivers 52. An object oriented generic device interface 54 is provided as this bridge. Interface 54 allows the OO software to retain all of its advantages while allowing communication to exist between the OO software components and the device drivers. This allows OOP to be compatible with existing procedural code based device drivers. Additionally, the invention, by using OOP within itself, provides a front door for device drivers that are not OOP, to make the transition to OOP down the road.

In object oriented component 50, the OO code remains isolated from the procedural code in the procedural device drivers 52. In procedural device drivers 52, the procedural code remains intact and isolated from OO code in component 50. The OO component 50 attempts to make OO method calls to procedural device drivers, but since these calls are incompatible since the device drivers 52 attempt to make call backs upon receipt of procedural calls, a bridge is required. This bridge is achieved or provided in OO generic device interface 54. Device interface 54 uses OOP methods to wrap around the procedural code from the device drivers, thus allowing communication to occur between OO component 50 and procedural device drivers 52. Device interface 54 further comprises OO classes named DDInterface and DDTransport. Each class has OO characteristics, such as data encapsulation, containment, and independent roles that, together, build the bridge between OOP and procedural software models. In addition, these classes may be subclassed to achieve special characteristics that are necessary for specific devices or platforms. These classes perform the roles of: 1) providing an OO interface for other OO components, 2) isolating other OO components from the procedural device drivers, 3) encapsulating device specific information, thus providing device independence, 4) manipulating the object data type and attributes, 5) controlling the data flow to/from the procedural device driver, and 6) maintaining the "state" of the data flow.

Figure 3:
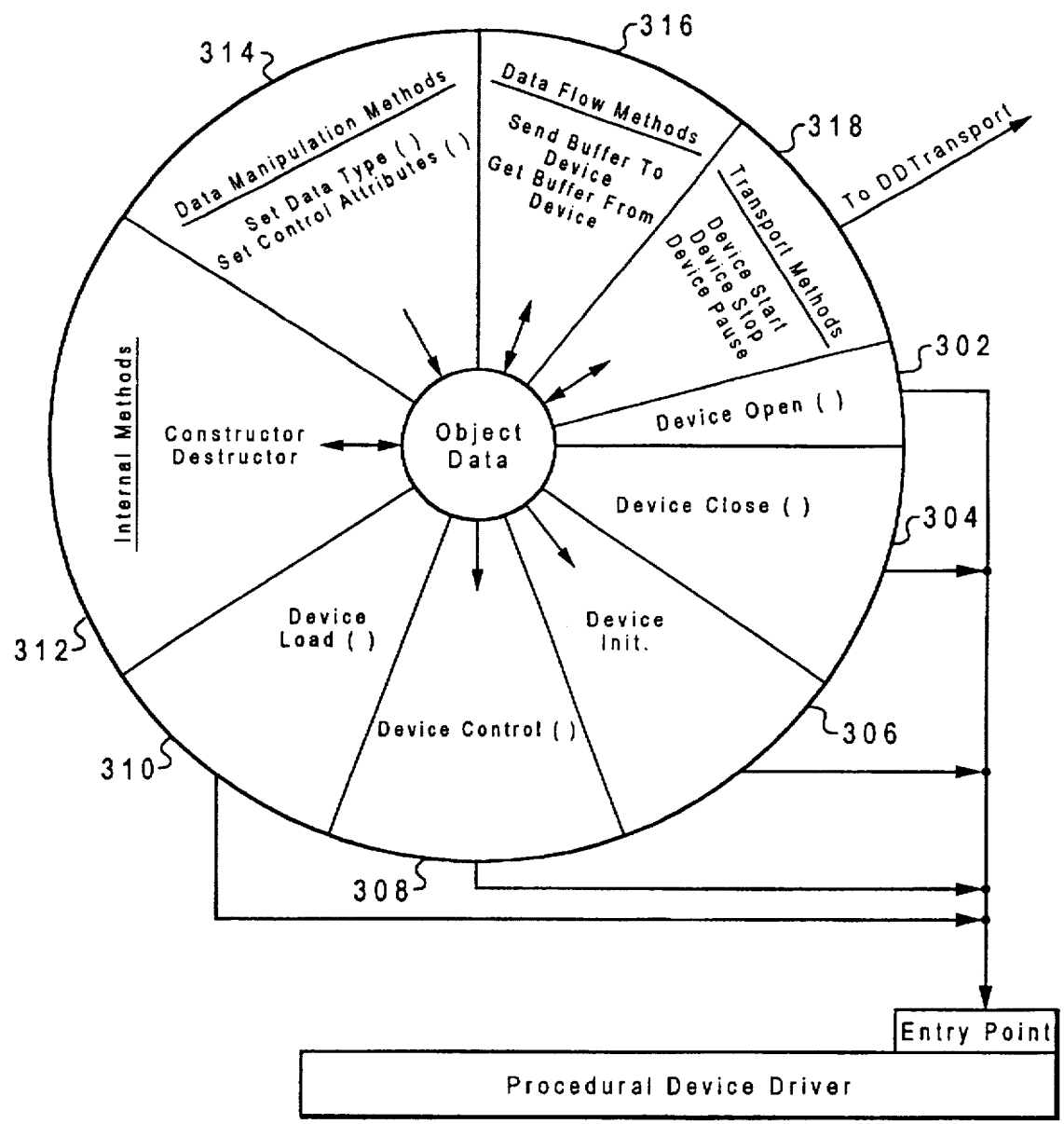
FIG. 3 depicts DDInterface class as a base class that other OO components interface with in order to gain communication to the procedural device drivers.
Figure 4:
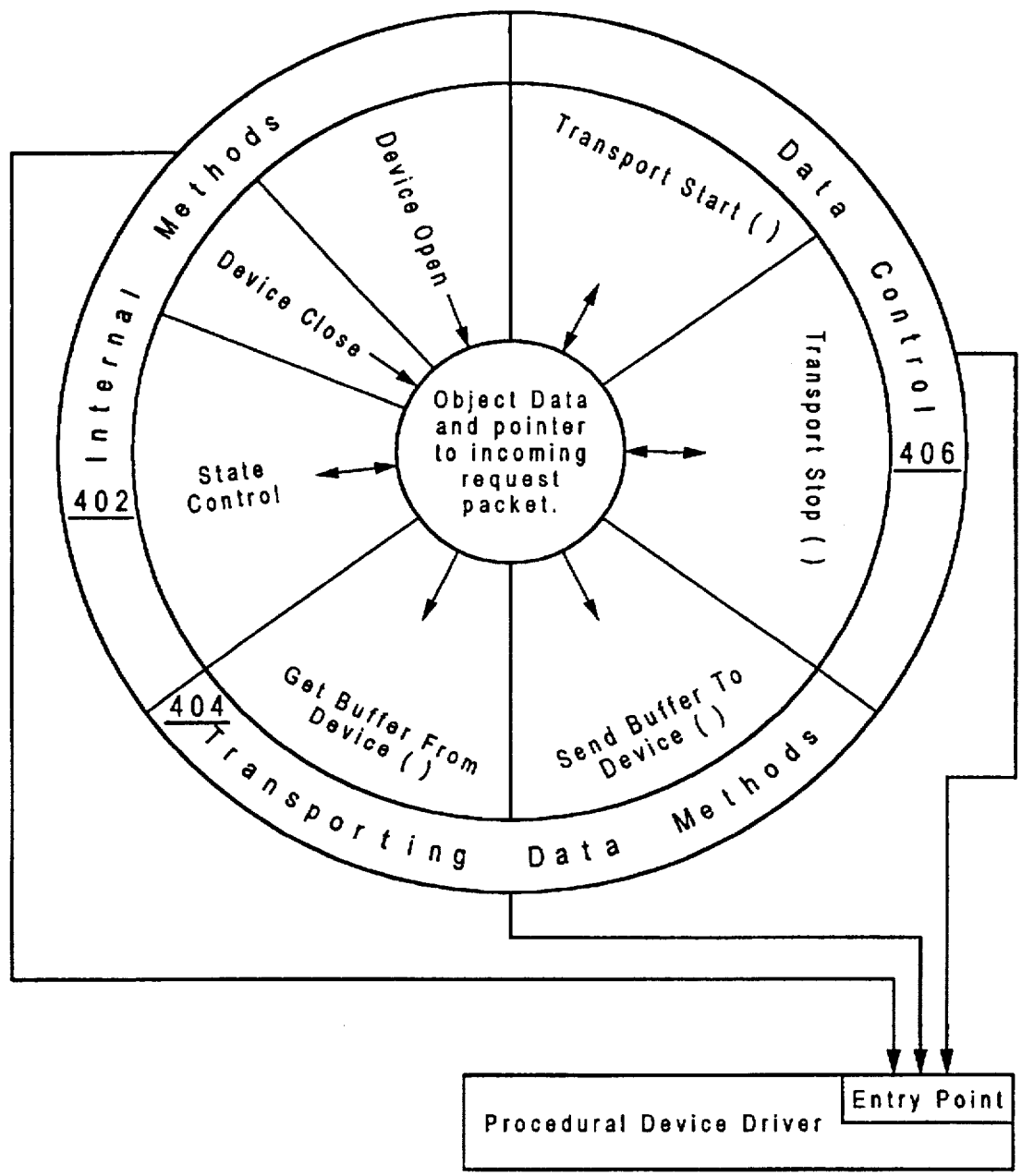
FIG. 4 is the operation of DDTransport class according to the present invention.

DDInterface class is a base class that other OO components interface with in order to gain communication to the procedural device drivers. In addition, DDInterface has OO methods that contain procedural code to access the device drivers. This class provides the functions outlined in the block diagram of FIG. 3. One function, shown in block 302, opens communication to the device driver from object oriented component using DeviceOpen ( ). Another function is shown in block 304 and provides closing communication to the device driver using DeviceClose ( ). The DeviceInit function shown in block 306 is that of initializing the device, via the device driver, while the Device-Control ( ) function in block 308 is that of controlling the device via the device driver. In block 310, the DeviceLoad ( ) function is that of loading microcode into the device, via the device driver. Blocks 302–310 communicate with the entry port of the procedural device driver through the architect interface of the computer system, typically these are, for example, the DOS IOCTL, input/output control, or Mach's IPC, interprocess communication. In block 312, the internal methods of providing constructor and destructor operations on the object data are provided. In block 314, data manipulation methods, such as SetDataType ( ) and SetControlAttributes ( ) functions are also provided. In block 316, data flow methods such as the function send buffer to device and send buffer from device are depicted. In block 318, the transport method, which include functions device start, device stop, device pause, are operational to provide transport of the object data to the device driver via the DDTransport of the invention. The operation of DDTransport class is further depicted in the block diagram of FIG. 4, which is based upon the C++ code provided in the appendix.

The DDTransport class is a base class that the DDInterface class interfaces with in order to send certain requests or commands, or both, to the procedural device drivers. In addition, DDTransport class has the ability, or necessary methods, to communicate with other device drivers other than the device driver with which DDInterface is presently communicating. The DDTransport class provides the functions outlined in the block diagram of FIG. 4. The DDTransport class performs various functions and methods that include internal methods 402, transporting methods 404, and data control Operations 406. Within the internal methods 402 include DeviceOpen, DeviceClose, and StateControl with the object data along with a pointer to incoming request packets. Transporting data methods 404 include GetBufferfromDevice ( ) and SendBuffertoDevice ( ) functions similar to those in the DDInterface diagram of FIG. 3. Data control methods 406 include important functions TransportStart ( ) and TransportStop ( ) that are used to control the transportation of data from object to device driver. All three methods connect, at an entry point for the procedural device driver using either the IOCTL or IPC architect communication. The implementation and operation of both the DDTransport and DDInterface classes are further depicted in the flow diagram of FIG. 5.

Figure 5:
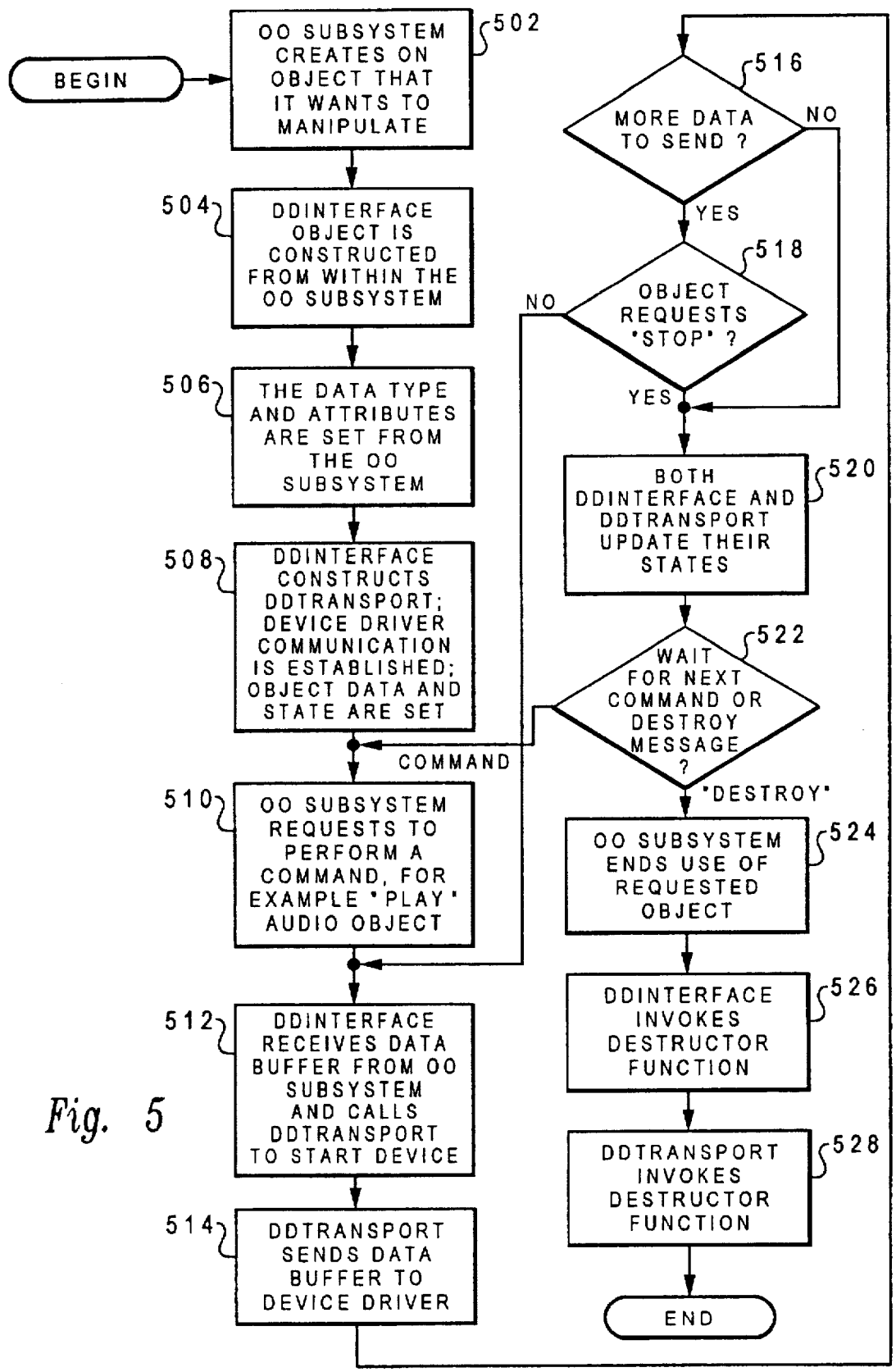
FIG. 5 depicts a block diagram of the steps in accessing procedural device drivers.

FIG. 5 depicts a block diagram of the steps implemented in accessing procedural device drivers. In block 502, the object oriented (OO) subsystem creates an object that it wants to manipulate, in this case an audio object. In block 504, the DDInterface object is constructed from within the object oriented subsystem. Next, in block 506, the data type and attributes are set from the object oriented subsystem as the DDInterface audio object. In block 508, the DDInterface constructs the DDTransport object and establishes device driver communication. At this stage, the object data and state are set. In block 510, the object oriented subsystem requests to play the audio object for example, which in reality is a request to do an action with the object, such as play an audio or video object, or the like.

In block 512, the DDInterface receives data buffer from the OO subsystem and calls DDTransport to start the device. Specifically, the DDInterface issues a start command and a send data command. Next, in block 514, DDTransport sends data buffer to the device driver and then, in block 516, decides whether more data is to be sent until such a time that the OO subsystem requests a "stop" in block 518. If no "stop" has been issued and there is more data to send, the system returns to block 514. If there is no more data to send or if the audio object has sent a "stop" request, the system then proceeds to block 520. In block 520, both the DDInterface and DDTransport update their states in their state control methods. Next, in block 522, the system then waits for the next command and if one is received returns to block 510. Any type of command is possible such as another "play", or a data type change request, or a request to destroy, or otherwise modify the data. In block 524, the OO subsystem is finished with the audio object, which is then destroyed. In block 526, the DDInterface destructor is activated, which terminates any pending transfers, closes the device driver, and terminates itself. Then, in block 528, the DDTransport doses the device driver and then terminates itself when activating the DDTransport destructor function. The operation of DDTransport class is based upon the C++ program code in the appendix under the DDTransport title.

Figure 6:
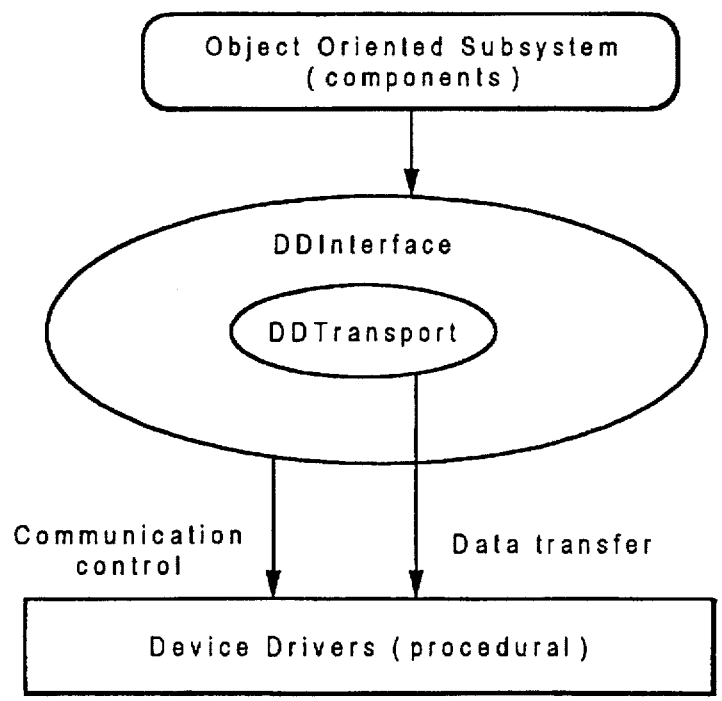
FIG. 6 is a block diagram depicting the abstract classes and their respective roles to the procedural device drivers.
Figure 7:
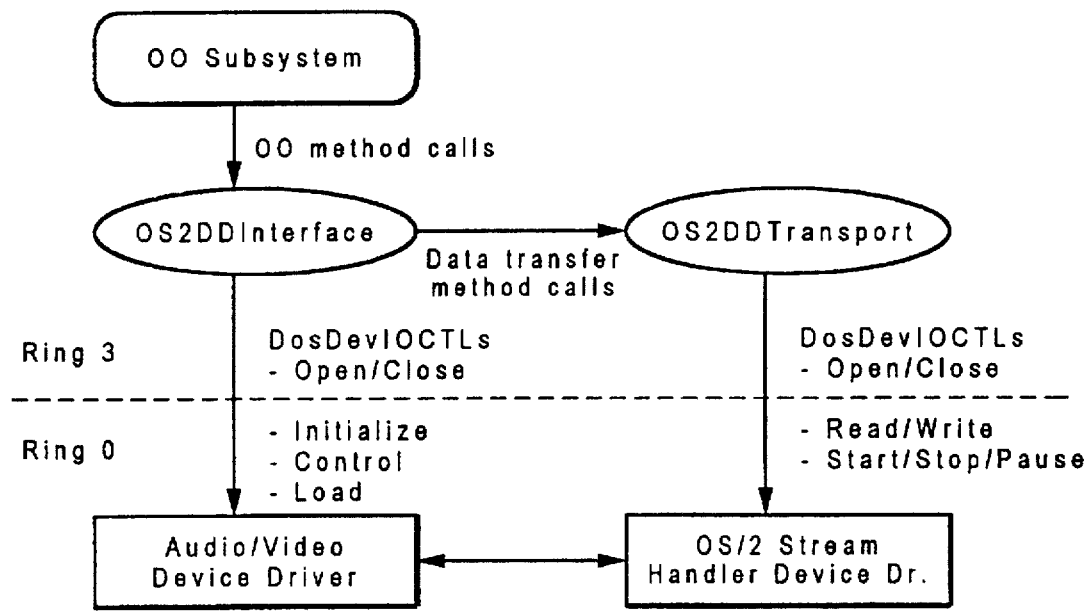
FIG. 7 depicts a block diagram of how the base classes DDInterface and DDTransport are subclassed to achieved platform independence.
Figure 8:
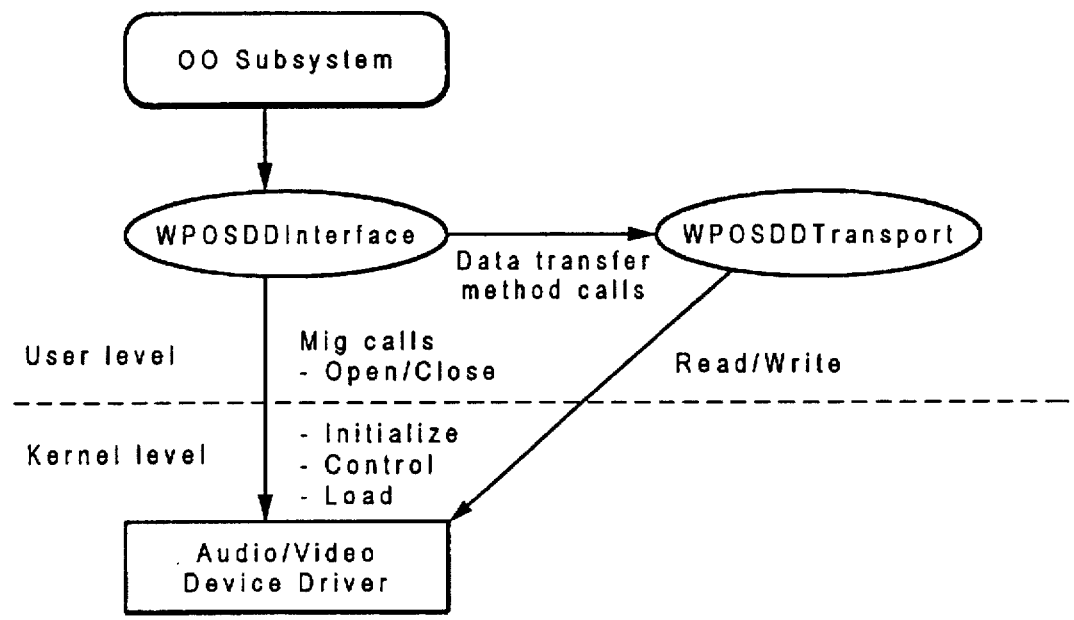
FIG. 8 depicts a block diagram of the base classes DDInterface and DDTransport being subclassed to achieve portability on another platform.

Both DDInterface class and DDTransport class are classes designed to be derived to each device or platform specifics. Specifically, these classes must be derived to be utilized since this is the nature of being an abstract class. It is in this process of deriving, or subclassing, where the present invention provides its flexibility over that of the prior art. FIGS. 6–8 depict the progression of how these abstract classes transform into specific implementations to provide bridging between OOP components and procedural device drivers.

FIG. 6 is a block diagram depicting the abstract classes and their respective roles to the procedural device drivers. The DDInterface object allows the OO subsystem to communicate with it, yet it prevents the OO subsystem from having to know about or even be aware of how the request is to be honored and what drivers are able to honor that request. Specifically, the OO subsystem can use any device that DDInterface object can communicate with while retaining full device independence. This system while providing device independence, also provides platform independence.

FIG. 7 depicts a block diagram of how the base classes DDInterface and DDTransport can be subclassed to achieved platform independence. This allows an entire OO subsystem to be ported over to another operating system platform. In the example of FIG. 7, the OS platform using OS/2 DDInterface and OS/2 DDTransport, requires two device drivers to handle a given request from an OS subsystem. OS/2 DDInterface is used as the bridge between the OO subsystem and the device driver, but now a second device driver is present to handle data transfers. OS/2 DDTransport serves to provide communication with the second device driver. No changes were required on the OO subsystem to function in this two device driver OS/2 platform. Only the DDInterface and DDTransport classes were subclassed to operated on this platform. At the ring three level, the DOS DEV IOCLTs for both the OS/2 DDInterface and OS/2 DDTransport provide the functions of opening and closing the device driver. At the ring zero level, separated from ring 3 by the dashed line in FIG. 7, the functions of initializing, controlling, and loading from the device driver by the OS/2 DDInterface is represented while the functions of read/write, start/stop/pause, for the second device driver are handled by the OS/2 DDTransport subclass. The first device driver is audio/video device driver, which communicates with the second device driver, which is an OS/2 stream handler device driver.

FIG. 8 depicts a block diagram of the base classes DDInterface and DDTransport being subclassed to achieve portability on another platform, which is a Microkernel based OS (µK). The derived classes are µK DDInterface and µK DDTransport which are built to the protocol specifics of the microkernel OS. The OO subsystem again requires no modification in its port to this platform. This example includes only a single device driver, which is audio/video device driver. At the user level, µK DDInterface provides the functions under Mach Interface Generator (MIG) calls of opening and closing the device driver while the µK DDTransport subclass provides the function of performing read/write calls to the device driver. At the kernel level, the µK DDInterface provides the functions of initializing and controlling the device via the device driver, and loading microcode into the device via the device driver. Data transfer method calls are sent from µK DDInterface subclass to µK DDTransport subclass.

While the invention has been particularly shown and described with reference to a preferred embodiment, it will be understood by those skilled in the art that various changes in form and detail may be made therein without departing from the spirit and scope of the invention.

APPENDIX

DDInterface Class Definition and Associated Structures Follow:

```
typedef struct {
        int     fObjectType;        // AUDIO or VIDEO
        void *  fpvDataType;        // ptr to audio/video data type struct
        void *  fpvDeviceAttributes; // ptr to audio/video device attribute struct
    } ObjectSpecifics;
typedef ObjectSpecifics   *POBJECTSPECIFICS;

typedef struct {
        int     fAudioType;         // PCM, ADPCM
        int     fBitsPerSample;     // 8 or 16
        int     fChannels;          // 1 or 2
        int     fSampleRate;        // 8kHz, 11, 22, 44, etc
    } AudioDataType;
typedef AudioDataType *PAUDIODATATYPE;

typedef struct {
        int     fReserved[4];       // TBD
    } VideoDataType;
typedef VideoDataType *PVIDEODATATYPE;

#define AUDIO 1                     // fObjectType(s)
define VIDEO 2 typedef struct {
        long int fVolume;           // 0x7fff0000
        long int fVolumeDelay;      // 0
        long int fBass;
```

```
1      long int fTreble;
2      long int fBalance;           // 0x3fff0000 = 50%
3      long int fBalanceDelay;      // 0
4      short int fMasterVol;        // 0x7fff = 100%
5      short int fDitherpct;        // 33
6      long int fMonitor;           // AUDIO_IGNORE
7      long int fInputs;            // AUDIO_IGNORE
8      long int fOutputs;           // INTERNAL_SPEAKER
9    |EXTERNAL_SPEAKER | OUTPUT_1
10   } AudioDeviceAttributes;
11   typedef AudioDeviceAttributes *PAUDIODEVICEATTRIBUTES;
12
13   typedef struct {
14       long int fVideoStuff;       // TBD
15       } VideoDeviceAttributes;
16
17   typedef VideoDeviceAttributes *PVIDEODEVICEATTRIBUTES;
18
19   //*****************************************************
20   //* Class:   DDInterface
21   //* Type:    ABSTRACT
22   //* Purpose: To provide a insulated generic layer between the
23   //*          OO subsystem and the audio device drivers.  This
24   //*          class can be used for either the OS/2 or WPOS platforms.
25   //*          This class accepts calls from the OO subsystem and
26   //*          routes the requests to the DDTransport class.
27   //*****************************************************
28
29   #define VERSION 100
30
31   class DDInterface {
```

```
1    public:
2
3        DDInterface();
4        virtual ~DDInterface();
5        virtual void   SendBufferToDevice(void* pBuffer, size_t buffersize);
6        virtual void   GetBufferFromDevice(void* pBuffer, size_t buffersize);
7        virtual void   DeviceStart();
8        virtual void   DeviceStop();
9        virtual void   DevicePause();
10       virtual void   SetDataType(void * pDataType);
11       virtual void   SetControlAttributes (void *pDeviceAttibutes);
12
13       //*******************************
14       // Subclasser must override!
15       //*******************************
16
17       virtual void   DeviceOpen() = 0;
18       virtual void   DeviceClose() = 0;
19       virtual void   DeviceInit() = 0;
20       virtual void   DeviceControl() = 0;
21       virtual int    DeviceLoad() = 0;
22
23
24
25   protected:
26
27       virtual void PrintDebugInfo();
28       DDTransport *  pDDTransport;      // ptr to DDTranport class
29       ObjectSpecifics fObjSpecific;     // structure containing the object type
30                                         // and its data specifics.
31       unsigned short   fStateFlg;       // see defines below
```

```
 1
 2      private:
 3
 4         int        fVersion;
 5
 6      };
 7
 8
 9
10   //*******************************
11   // fStateFlg  Values
12   //*******************************
13   #define  STREAM_NIL        0x0001      // data NOT ready to flow
14   #define  STREAM_STOPPED    0x0002
15   #define  STREAM_RUNNING    0x0004
16   #define  STREAM_PAUSED     0x0008
17   #define  STREAM_MIXED      0x0010
18
19
```

DDTransport Class Definition and Associated Structures Follow:

```
typedef struct   TransportReqPkt {
         int   request;
         };

//***************************
// request defines for
// jump table router.
//**************************
#define  TRANS_REQ_READ    1
#define  TRANS_REQ_WRITE   2
#define  TRANS_REQ_START   3
#define  TRANS_REQ_STOP    4
#define  TRANS_REQ_PAUSE   5
define  TRANS_REQ_RESUME  6 typedef struct TransportReadWritePkt {
         int    request;
         void*  pBuffer;
         size_t buffersize;
         size_t count;           // actual bytes read/written
         };

typedef struct TransportControlPkt {
         int    request;
         void*  reserved;
         };
```

```
1
2      //*****************************************************
3      //* Class:   DDTransport
4      //* Type:    ABSTRACT
5      //* Purpose: Provides the mechanism to route "streaming" requests
6      //*          and data to the specific device drivers. This class
7      //*          will be subclassed to provide platform implementation
8      //*          specifics.
9      //*          For OS/2: IOCTLs will be issued to the audio stream
10     //*                    handler device driver. The stream handler then
11     //*                    will interface with the audio PDD via the IDC
12     //*                    mechanism.
13     //*          For uK:   This class will issue "port requests" directly
14     //*                    to the audio PDD, where ports are defined by
15     //*                    the microkernel based OS.
16     //*****************************************************
17
18     class DDTransport {
19
20       public:
21
22         typedef void (DDTransport::*RemoteFnPtr)(TransportReqPkt* pReqPkt);
23
24         DDTransport();
25         virtual ~DDTransport();
26         void    TransportEntry(TransportReqPkt* pReqPkt);
27
28
29       protected:
30
31         virtual void  PrintDebugInfo();
```

```
1    //****************************************
2    // Subclasser must override
3    //****************************************
4
5         virtual void   GetBufferFromDevice(TransportReqPkt* pReqPkt)=0;
6         virtual void   SendBufferToDevice(TransportReqPkt* pReqPkt)=0;
7         virtual void   TransportStart(TransportReqPkt* pReqPkt)=0;
8         virtual void   TransportStop(TransportReqPkt* pReqPkt)=0;
9
10        RemoteFnPtr    (&TransportMethods)[];
11        unsigned short MaxTransMethods;        // num of methods,subclasser
12   can override
13        unsigned short fStateFlg;              // see defines below
14
15   };
16
17
18
19   //*******************************
20   // fStateFlg Values
21   //*******************************
22   #define  TRANSPORT_KILLED        0x0000      // Destructed
23   #define  TRANSPORT_ALIVE         0x0001      // DD is open
24   #define  TRANSPORT_INSTANTIATED  0x0002      // Empty obj
25   #define  TRANSPORT_READ          0x0004      // Buffer read
26   #define  TRANSPORT_WRITE         0x0008      // Buffer sent
27   #define  TRANSPORT_START         0x0010      // Start in progress
28   #define  TRANSPORT_STOP          0x0020      // Stop in progress
29   #define  TRANSPORT_PAUSE         0x0040      // Pause in progress
30   #define  TRANSPORT_RESUME        0x0080      // Resume in progress
31   #define  TRANSPORT_INPROGRESS    0x0100      // Transport called
```

I claim:

1. An apparatus for bridging communications between an object oriented component and a procedural programmed device driver, which are both part of a data processing system, the apparatus comprising:
   an object oriented interface device that couples said object oriented component to said device driver;
   means, coupled to said object oriented interface device, for isolating said object oriented component from said device driver, said isolating means including procedural code to open, initialize, control, and close said device driver, and further including first means for providing data flow; and
   means for encapsulating device specific information, coupled to said isolating means, said encapsulating means being independent from but responsive to said isolating means, to transport requests and commands to said device driver, and further including second means for providing data flow such that said encapsulating means may communicate with other device drivers besides said device driver.

2. The apparatus according to claim 1, wherein said object oriented interface device further comprises:
   means for loading microcode from said object oriented component into said device via said device driver.

3. The method according to claim 1, wherein said isolating means further comprises means for opening communication to said other device drivers.

4. The method according to claim 1, wherein said encapsulating means further comprises means for transporting data from said device driver.

5. In a data processing system having an object oriented component and a plurality of procedural programmed device drivers, a method for bridging communication between said object oriented component and at least one of said plurality of procedural programmed device drivers, comprising the steps of:
   isolating said object oriented component from said at least one of said plurality of device drivers using procedural code adapted to open, initialize, control, and close said device drivers;
   encapsulating said specific device driver information associated with said at least one of said plurality of device drivers; and
   transporting requests or commands, or both from said object oriented component to said at least one of said plurality of device drivers, while providing independent data flow to others of said plurality of device drivers.

6. The method according to claim 5 wherein said step of transporting requests or commands further comprises the steps of:
   opening communcation to said at least one of said device drivers; and
   initializing said device via said device driver.

7. The method according to claim 6 further comprising the step of:
   loading microcode from said object oriented component into said device via said device driver.

8. The method according to claim 6 wherein said transporting step further comprises the step of:
   opening communication into other device drivers.

9. The method according to claim 6 wherein said transporting step further comprises the step of transporting data from said device driver.

10. The method according to claim 6 wherein said transporting step further comprises the step of controlling said data flow between said object oriented component and said at least one of said plurality of device drivers.

* * * * *